March 14, 1961 S. WLASUK 2,975,229

TELEVISION TEST APPARATUS

Filed June 30, 1954 4 Sheets-Sheet 1

INVENTOR.
STEVEN WLASUK
BY
[signature]
ATTORNEY

March 14, 1961 S. WLASUK 2,975,229

TELEVISION TEST APPARATUS

Filed June 30, 1954 4 Sheets-Sheet 2

INVENTOR.
STEVEN WLASUK
BY [signature]
ATTORNEY

March 14, 1961 S. WLASUK 2,975,229

TELEVISION TEST APPARATUS

Filed June 30, 1954 4 Sheets-Sheet 3

INVENTOR.
STEVEN WLASUK
BY
[signature]
ATTORNEY

March 14, 1961 S. WLASUK 2,975,229

TELEVISION TEST APPARATUS

Filed June 30, 1954 4 Sheets-Sheet 4

INVENTOR.
STEVEN WLASUK
BY
[signature]
ATTORNEY

United States Patent Office 2,975,229

Patented Mar. 14, 1961

2,975,229

TELEVISION TEST APPARATUS

Steven Wlasuk, Brooklawn, N.J., assignor to Radio Corporation of America, a corporation of Delaware Filed June 30, 1954, Ser. No. 440,358

15 Claims. (Cl. 178—5.4)

This invention relates to television apparatus and more particularly to apparatus for use in testing color television apparatus.

With the advent of color television, it is desirable to provide some source of signal which simulates the characteristics of a standard signal approved by the Federal Communications Commission for U.S. broadcast use. At color television transmitters it is possible to televise colored pictures or transparent slides to generate signals which can be used to calibrate or otherwise adjust the particular television apparatus under test. When a color television receiver is installed in the home of the ultimate consumer, a source of a standard signal which can be used to test the color response of the particular receiver and other characteristics is needed. Although actual color television programs on the air may be used as a source of test signal, this is not as satisfactory for some purposes as a signal which is maintained constant and thereby permits comparative evaluation over the period of the test time. Furthermore, until such time as color television broadcasts are on a regular basis, the serviceman may not at all hours be able to tune the receiver to a color broadcast. It is therefore highly desirable to have a portable instrument for generating a test signal suitable for checking and adjusting the color oscillator, the phasing and matrixing circuits, and the RF, IF and video sections of color receivers.

A useful feature of such test equipment would be a signal which produces a number of units on the receiver display tube each of which is characteristic of different colors to be reproduced by the receiver itself. For example, a series of vertical bars displayed from left to right across the face of the color kinescope would be helpful in determining the quality of the color rendition. Indirectly, some indication of the proper operating characteristic of the receiver circuits as well as the horizontal linearity of the receiver is given.

Such test apparatus would also be useful if it were designed to indicate visually the "fit" of the monochrome information with respect to the color information. The "fit" refers to one of the inherent characteristics of color television receivers. In modern color television receivers there are essentially three types of information which are simultaneously passed through the various stages thereof. The luminance or "Y" signal has the broadest band of frequencies and extends approximately to 3.5 mc. For intermediate detail a so-called "I" signal is transmitted which has a pass band up to 1.5 mc. For large area reproduction, a so-called "Q" signal is transmitted which has a frequency range up to .5 mc. Because of the various bandwidths the signals, in passing through the apparatus, are delayed by varing amounts. A delay line is usually included in the luminance channel of the color television receiver to compensate for the variations in delay of the luminance signal and the chrominance signals. By the use of the apparatus described herein, the time relations between the luminance and chrominance signals may be ascertained visually.

According to the present invention, apparatus is provided for generating a number of differently colored vertical bars on the face of the color television display means, or for use as a test signal which may alternatively be transmitted. A black monochrome area is placed along one side of each vertical bar and a white area is placed in contact with the other side of each bar so that the relative time delay in the various signal channels may be observed. The apparatus further possesses many inherent advantages for use in checking color television receivers and transmitters.

A primary object of the invention is to provide a simulated color television signal for test purposes.

A further object of the invention is to provide a visual display of the color fidelity of a color television receiver.

Still another object of the invention is to provide apparatus for generating color television test signals for transmission by television stations. This provides the best possible coordination and standardization of the test signals used at the station and by servicing personnel.

A further aim of the invention is to provide a color test equipment which is more economical than presently available color bar generators, colorplexers, and related professional color television test equipment.

Another object of the invention is to provide a simple circuit for producing a phase-modulated sweep frequency at a constant recurring rate.

Additional objects will become apparent after a reading of the following specification and an inspection of the accompanying drawing in which:

Figure 1 is a block diagram showing the operating principle of the test equipment according to various forms of this invention;

Figure 2*a* is a schematic diagram showing circuitry that may be incorporated to perform the functions illustrated in Figure 1; and Figure 2*b* is a continuation of Figure 2*a*.

Figure 1:
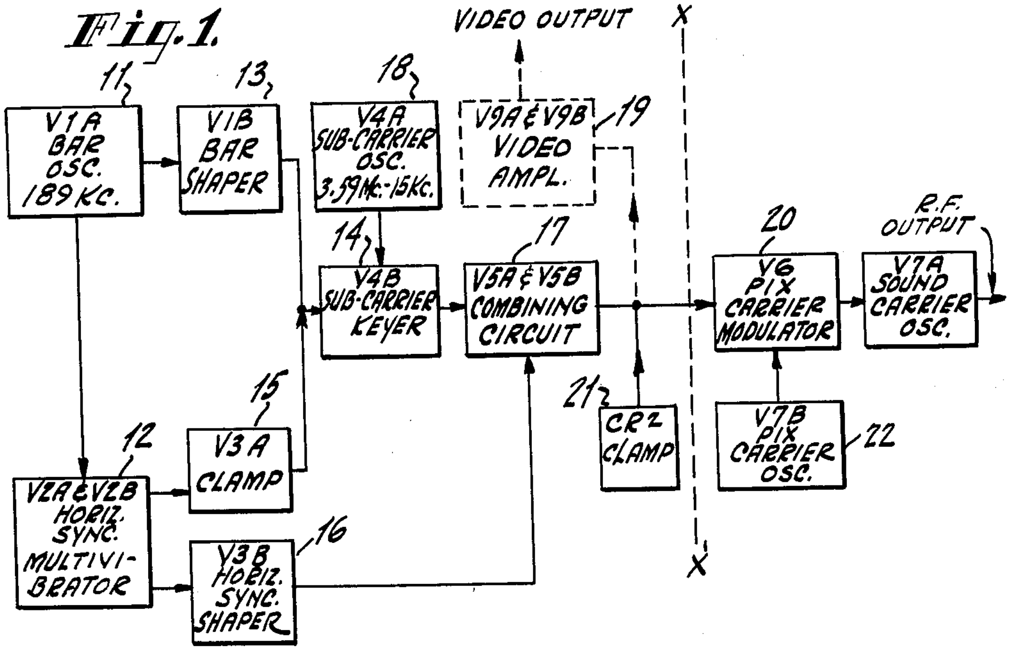
Figure 2A:
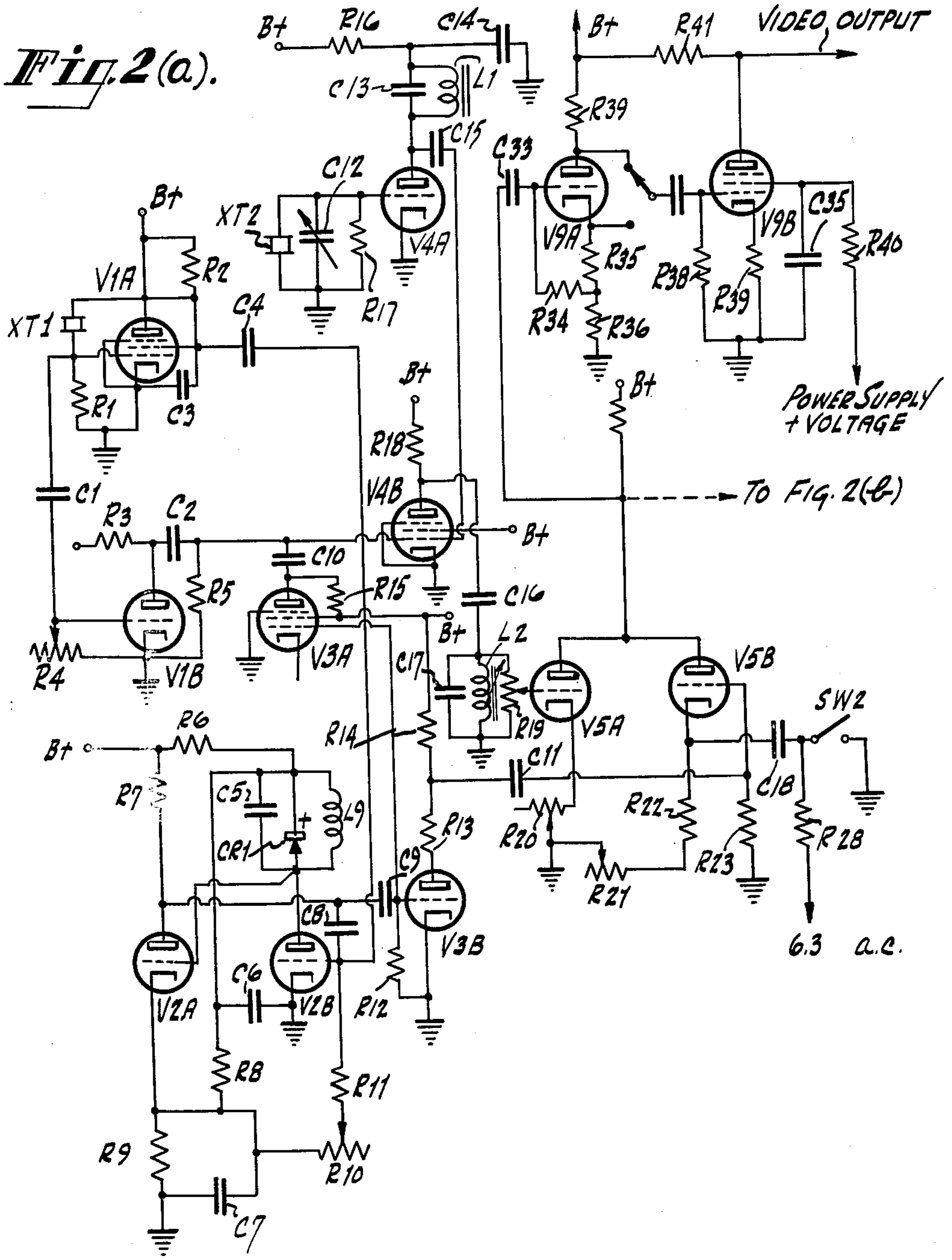
Figure 2:
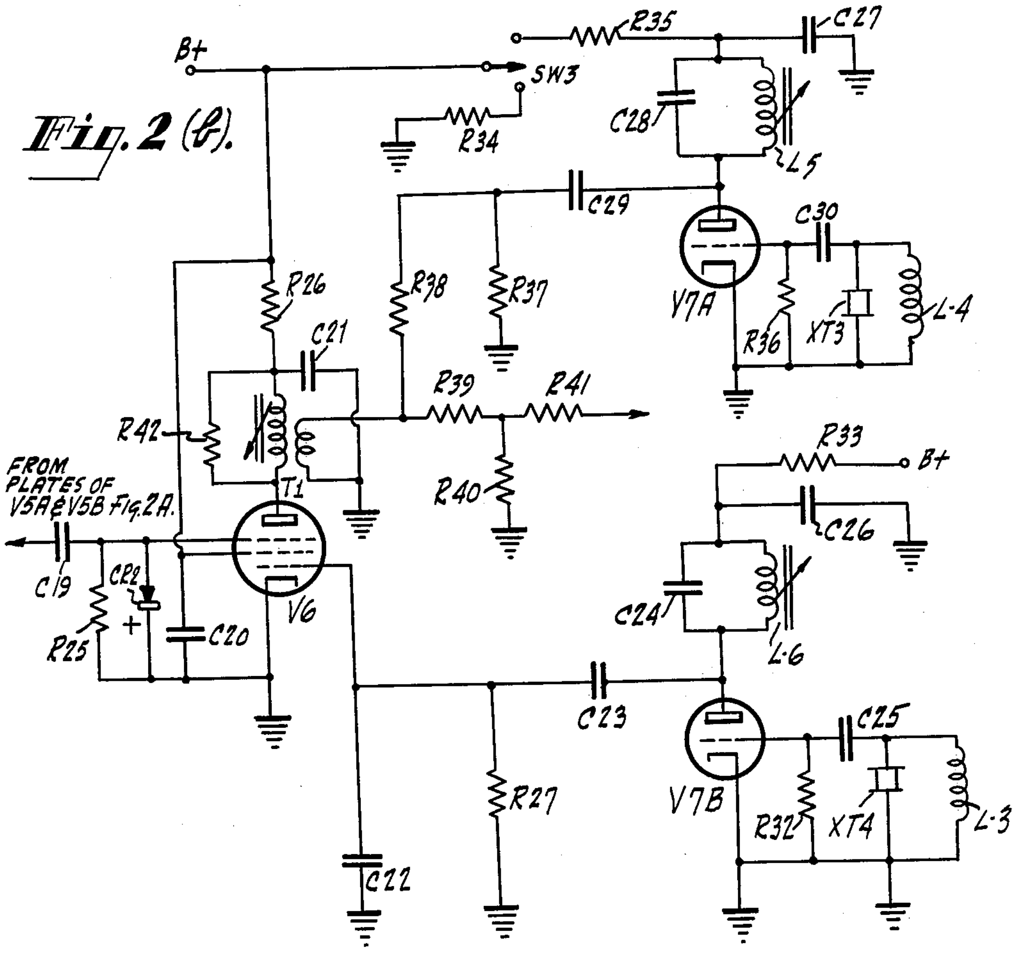

Referring in detail to Figure 1, it is to be noticed that each block contains a letter or numeral which refers to a corresponding tube in the schematic of Figures 2*a* and 2*b*. A crystal controlled offset subcarrier oscillator 18 generates a signal of a frequency equal to the color subcarrier frequency plus or minus a multiple of horizontal line frequency. As an example, a frequency of 3.563795 mc. is used, which is the color subcarrier frequency minus the line deflection frequency of 15.75 kc. The offset subcarrier signal is keyed on for short, uniformly-spaced intervals by keyer 14. A bar oscillator 11 generates a wave of 189 kc. pulses. 189 kc. is the twelfth multiple of the horizontal deflection sync frequency 15.75 kc. A horizontal deflection sync multivibrator 12 receives part of the output of bar oscillator 11 and is synchronized thereby. Another portion of the output of oscillator 11 is applied to bar shaper 13. The shaped 189 kc. pulses, appearing in the output of bar shaper 13, are then applied to the input of subcarrier keyer 14 to key on the offset subcarrier signal in response to the shaped 189 kc. pulses.

The horizontal sync pulses, produced by multivibrator 12, are applied to a clamp 15 whose output is coupled across the input of subcarrier keyer 14. The clamp 15 operates so that every twelfth pulse of the 189 kc. pulses is removed from the input to the subcarrier keyer 14. Another portion of the output of multivibrator 12 is shaped by horizontal sync shaper 16, and each time that the 189 kc. pulse is removed from the input to keyer 14, a sync pulse is supplied by the sync shaper 16 to a combining circuit 17. The keyer 14 thus produces 11 consecutive bursts of 3.563795 mc. to the combining circuit 17. Ten of the bursts produce ten vertical colored bars in the display means and one serves to synchronize the local reference oscillator at the receiver. The horizontal sync is inserted during the interval which would be occupied by the twelfth pulse from bar shaper 13 by combining circuit 17 which also receives the output of subcarrier keyer 14. The burst immediately following the sync pulse occurs during blanking and therefore does not produce a color bar. This is the burst on which the local subcarrier oscillator in the receiver is synchronized. Its operation will be described in the following paragraph.

If the apparatus is to be used in conjunction with television transmitters, the output of combining circuit 17 may be applied to a video amplifier 19 which is shown in a dashed line box and thence to the input of the RF section of the transmitter. This provides the television station with color bar signals for transmission.

On the other hand, if it is desired to use the apparatus to check receiver performance, the output of combining circuit 17 is applied to a picture carrier modulator 20. A clamp circuit 21 is provided for clamping at the level of the tips of the sync inserted by the combining circuit for fixing the maximum picture carrier output. A picture carrier oscillator 22 supplies the carrier to be modulated. The output of the modulator 20 is then applied to a sound carrier oscillator 23 which accompanies the picture carrier. The sound and picture components may then be applied to the antenna terminals of any receiver for test purposes.

Turning now to Figures 2*a* and 2*b*, a more detailed explanation of the operation of the components shown in Figure 1 will be given. Tube V1A is the 189 kc. bar oscillator which is crystal controlled. Its output is coupled by condenser C4 to the control grid of horizontal sync multivibrator V2B. Tubes V2A and V2B comprise the multivibrator which operates at the line frequency, being locked in by every 12th cycle of the 189 kc. crystal-controlled signal from tube V1*a*. The output of the oscillator V1*a* is also applied to the control grid of bar shaper V1B. The output of the bar shaper V1B is then applied to the control grid of subcarrier keyer V4B to turn the keyer on for eleven relatively short, evenly spaced intervals during one horizontal line. (The 12th interval is skipped as will be explained later.)

A portion of the horizontal sync multivibrator V2A and V2B output is applied through condenser C9 to clamp tube V3A and to the horizontal sync shaper V3B. The latter shapes the horizontal pulses and removes the 189 kc. sync pulses. The clamp V3A is keyed on by the application to it of the horizontal sync pulse at a time when each twelfth bar from bar shaper V1B occurs. Therefore, each twelfth pulse is shorted out and does not appear on the control grid of the subcarrier keyer V4B. To the control grid of the keyer V4B a sine wave is applied, produced by the subcarrier oscillator V4A, which is crystal controlled to resonate at 3.563795 mc. (i.e., the standard subcarrier minus H). Therefore, at the plate of keyer V4B, eleven bursts of 8 or 9 cycles of 3.56+ mc. appear in succession followed by a gap produced by the shorting action of clamp V3A. During the gap interval the horizontal sync pulse is transmitted. The first 3.56 mc. burst following the sync pulse occurs during blanking and is used to phase-lock the local subcarrier generator to the standard subcarrier frequency.

This wave train is applied to V5A and V5B which comprises a combining circuit. A portion of the shaped horizontal sync from V3B is applied to a control grid of the triode section V5B so that during the gap, the horizontal sync is inserted. The output of the combining circuit V5A and V5B may then be applied either to a transmitter or to a receiver.

The operation of the invention, as applied to a transmitter, will first be explained. The plates of the combining circuit V5A and V5B are coupled together, and to the control grid of an amplifying triode V9A via a condenser C33. Either the plate or cathode of V9A is switchably coupled to the control grid of a pentode V9B which also provides a level of output voltage suitable for application to the RF stages of a typical television transmitter. By means of the switch connection, either a positive- or negative-going video output signal may be obtained.

If the apparatus is to be used for receiver testing, the output of the combining circuit V5A and V5B is applied via condenser C19 in Figure 2*b* to the circuitry to the right of the vertical dashed line X—X′. It is applied to the suppressor grid of tube V6. A clamp CR–2 is also coupled to the suppressor grid for clamping on the tips of the sync pulses to fix the maximum picture carrier output produced by the modulator tube V6. To the control grid of tube V6, an oscillatory wave having the frequency of a desired station or stations, i.e., channels 3 or 4, is coupled. The modulator V6 accordingly produces a modulated picture carrier which is coupled via transformer T1 and condenser C29 to the plate of tube V7A. A sound carrier from a crystal controlled circuit, including crystal XT3 and L4, is resistively added to the output circuit. A modulated picture wave can then be taken from the plate of tube V7A via transformer T1 to an output jack or circuit which is to be coupled to the receiver under test.

Figure 3:
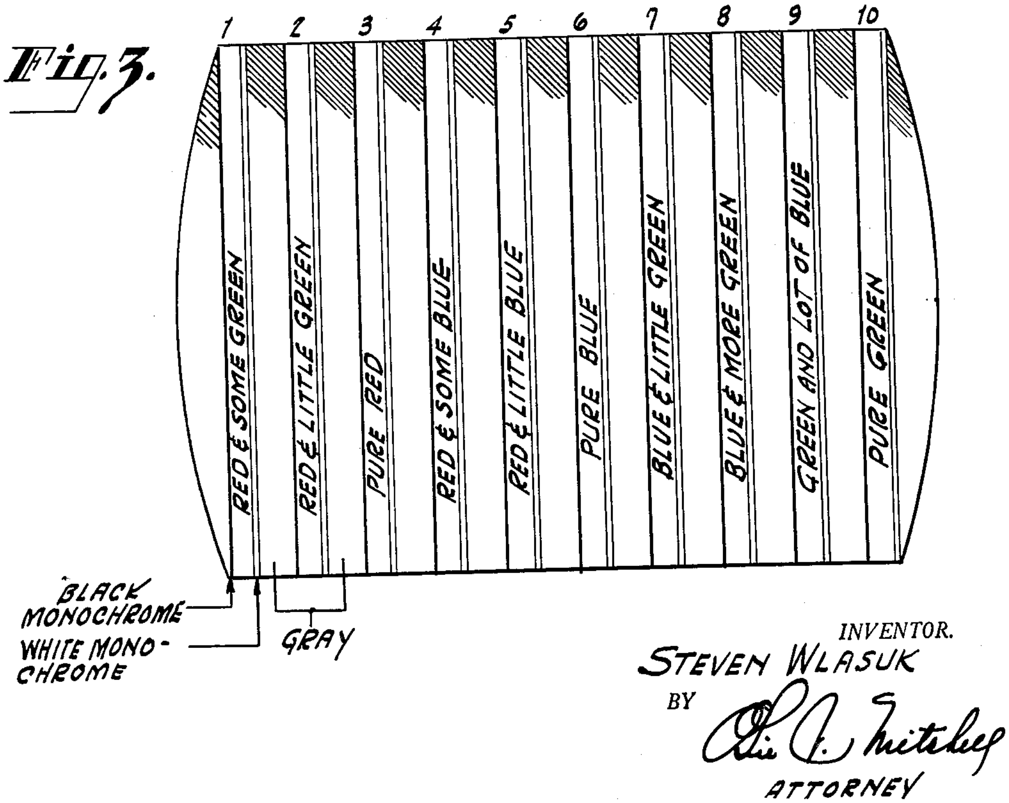
Figure 3 is a representation of the face of a color television display means energized with signals produced by apparatus built in accordance with this invention.

If the output of subcarrier oscillator V4A were not chopped into discrete units, or bursts, there would be a rainbow progression of colors from the left side to the right side of the color receiver. This results from the fact that the frequency of the wave produced by the oscillator V4A beats with the frequency of the local subcarrier oscillator in the receiver so as to produce a difference frequency of 15.75 kc. times N. The latter frequency (where N is any whole number) is, of course, the same as the horizontal line frequency. This means that for each line the wave produced by oscillator V4A will be displaced by one or more cycles with respect to the local subcarrier signal. In other words, there will be a resultant phase variation of 360° or multiples between the two signals thereof for each horizontal line. This resultant is, in effect, a phase modulated sweep signal which sweeps the color circuits in the receiver so as to produce the complete range of colors on the kinescope. However, since the 3.56 subcarrier is keyed-on for bursts of only 8 or 9 cycles in response to the 189 kc. pulses applied to the keyer V4B, the presentation is that of a number of vertical bars on the kinescope as shown in Figure 3. This method of producing a sweep frequency requires no additional means, electronic or mechanical, for varying the capacitance or inductance of a tuned circuit such as is normally found in ordinary sweep frequency generators.

It is to be noted that a black area appears to the left of each vertical color bar, and a white area appears on the right side of each bar on the kinescope screen. These black and white areas are produced by generating small monochrome pips at the beginning and end of each discrete burst gated in by the color subcarrier keyer V4B. More specifically, the circuit between the plate of V4B and the grid of tube V5A comprising R18, C16, C17, and L2, derives the monochrome marker pips from switching transients having a particular level. R19 prevents the tuned circuit from ringing. If the fit is not correct, these black and white areas will be displaced either to the left or right and will not embrace the vertical color bar.

The apparatus produces a horizontal sync pulse which locks the horizontal deflection oscillator in the receiver to one-twelfth of the 189 kc. burst-repetition frequency, or 15.75 kc. In some receivers this locking horizontal sync pulse may be necessary to operate the burst gate.

The receiver local subcarrier oscillator will "lock in" on the incoming 3.56+mc. offset subcarrier burst following the horizontal sync pulse, because it is characteristic of the phase comparison circuits of such sets that a false "phase lock" may occur on frequencies which are spaced at multiples of 15.75 kc. on either side of the standard color subcarrier. This is because the average phase of the offset subcarrier during the burst following the sync pulse is in sync with the phase of the local subcarrier generator. However, the local oscillator will continue to run at the standard color subcarrier frequency, because the inherent stability of the circuit prevents it from deviating sufficiently from subcarrier frequency to lock in at a frequency removed by the amount of the line frequency. Since eleven bursts of the 3.56+mc. frequency are provided, plus one burst being replaced by horizontal sync, there is a phase displacement of 30° for each burst interval, or 360° shift overall on each line. If a frequency of subcarrier plus or minus 1 H is used and if there are 8 or 9 cycles of offset subcarrier frequency per burst, there is a duty cycle of about 33% so that each burst has a duration of about 10° from beginning to end.

The circuit illustrated in Figures 2*a* and 2*b* has been found very satisfactory for generating the appropriate test signals. In one form the components therein indicated possessed the following values which are merely illustrative and are in no way to be considered limiting:

[Capacitors less than 1 are in mf. units; greater than 1 in mmf. units]

| | | | |
|---|---|---|---|
| C1 | 120 | R13 | 5K |
| C2 | 0.1 | R14 | 1K |
| C3 | 120 | R15 | 33K |
| C4 | 22 | R16 | 6.8K |
| C5 | 6800 | R17 | 1M |
| C6 | .25 | R18 | 1K |
| C7 | .25 | R19 | 100 |
| C8 | 240 | R20 | 1K |
| C9 | .01 | R21 | 10K |
| C10 | .01 | R22 | 680 |
| C11 | 0.1 | R23 | 680K |
| C12 | 7.45 | R24 | 1K |
| C13 | 120 | R25 | 3.3M |
| C14 | .047 | R26 | 1K |
| C15 | 6.8 | R27 | 470 |
| C16 | 120 | R32 | 15K |
| C17 | 120 | R33 | 1K |
| C18 mf. | 5 | R34 | 22K |
| C19 | .01 | R35 | 1K |
| C20 | .001 | R36 | 15K |
| C21 | .001 | R37 | 82 |
| C22 | 6.8 | R38 | 560 |
| C23 | 2.2 | R39 | 39 |
| C24 | 18 | R40 | 47 |
| C25 | 39 | R41 | 39 |
| C26 | .001 | V1A | ½ 6U8 |
| C27 | .001 | V1B | ½ 6U8 |
| C28 | 18 | V2A | ½ 12AT7 |
| C29 | 2.2 | V2B | ½ 12AT7 |
| C30 | 39 | V3A | ½ 6X8 |
| R1 | 1M | V3B | ½ 6X8 |
| R2 | 100K | V4A | ½ 6U8 |
| R3 | 2.7K | V4B | ½ 6U8 |
| R4 | 1M | V5A | ½ 12AT7 |
| R5 | 1M | V5B | ½ 12AT7 |
| R6 | 10K | V6 | 6AS6 |
| R7 | 9.1K | V7A | ½ 6BQ7A |
| R8 | 33K | V7B | ½ 6BQ7A |
| R9 | 9.1K | V9A | ½ 6U8 |
| R10 | 1M | V9B | ½ 6U8 |
| R11 | 100K | CR1 | 1N34–A |
| R12 | 470K | CR2 | 1N34–A |

Figure 4:
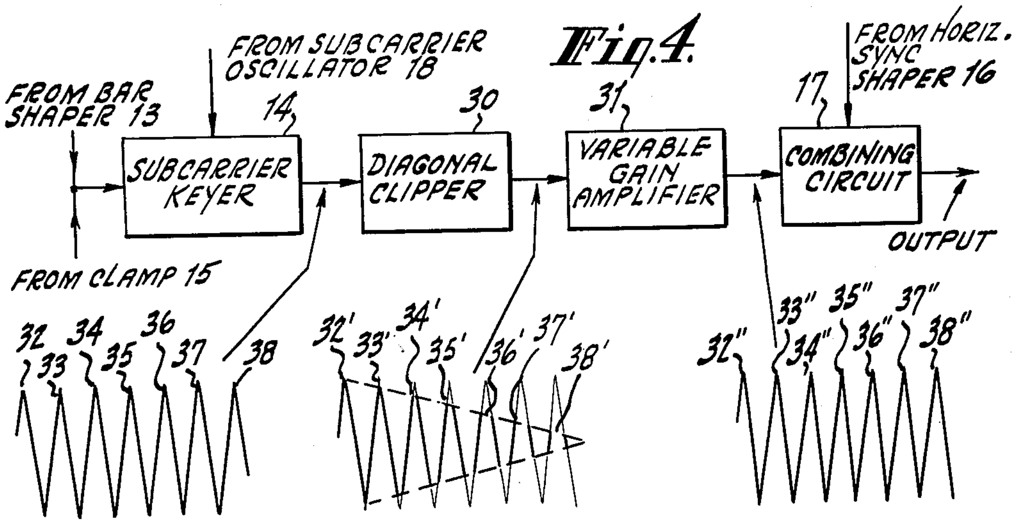
Figure 4 is a block diagram showing an alternative form of the invention.

A further refinement of the apparatus is shown in Figure 4 which may be added if desired. As stated above, the center of each vertical bar is approximately 30 electrical degrees away from that of the adjacent one. The color phase along any one scanned line progresses continuously through one complete revolution of 360°. Within any one color bar there is thus a phase displacement between the first and last cycles of the burst producing that bar. Assuming that the phase of the first cycle of burst signal of the approximately 8 cycles comprising the width of one bar is 0° with respect to the locally generated subcarrier phase, the last cycle lags with respect thereto by about 12°. This results in a small change in hue between the beginning and end of each color bar.

One embodiment of the invention which overcomes this hue change within a bar is shown in Figure 4. The output of the subcarrier keyer 14 shown in Figure 1 is comprised of approximately 8 cycles of the offset subcarrier signal. The peaks of these cycles, shown as maximum points 32 through 38, are uniformly spaced, but as mentioned above, when the positions of these peaks are compared with the peaks of the locally generated subcarrier signal in the receiver, the successive offset carrier peaks successively lag farther behind the respective peaks of the subcarrier. But if the hue during any color bar is to remain constant, the phase relation between these two signals must remain constant for the duration of the bar. In other words, if the first cycle of the burst for that color bar is, for example, 30 degrees behind the corresponding cycle of the subcarrier signal, each of the remaining seven cycles of the burst must also be made to remain 30 degrees behind its corresponding subcarrier cycle. This condition may be met if the peaks of each cycle within a burst are successively advanced in time by the correct amount. If the cycles in a burst, such as represented by peaks 32 through 38, were clipped in a diagonal manner such as represented by peaks 32' through 38', it can be seen that the point of highest amplitude of each successive cycle becomes increasingly closer to the new peak of the previous cycle. This method of clipping can be achieved by use of a signal-controlled amplitude selector, which hereinafter will be referred to as a "diagonal clipper." This type of amplitude selector can be found described in Vol. 19, "Waveforms" of the M.I.T. Radiation Laboratories Series, McGraw-Hill, beginning on page 391. A specific showing of the amplitude selector employed as the diagonal clipper 30 in Figure 4 of this application may be found in Fig. 11.6 on page 396 of the above-mentioned reference. A conventional push-pull sawtooth signal having a repetition frequency of 189 kc. would be applied to the input points $e_1$ and $e_2$, and phased to produce minimum clipping at the beginning of each burst.

The output of the diagonal clipper 30 consists of a tapered envelope, as shown by peaks 32' through 38'. If this tapered envelope is amplified in a variable gain amplifier 31, whose gain characteristic is an inverse function of the envelope slope, it will be seen that the output (as shown by peaks 32'' through 38'') will consist of a burst of 8 cycles whose successive peaks are spaced uniformly closer together. A control of the sawtooth signal amplitude used to modulate the diagonal clipper determines the amount of "squeezing" of the cycles within the bursts to compensate the phase "crawl" in each burst.

In operation, then, all offset subcarrier cycles within any one color-bar burst will remain at a constant phase difference from the subcarrier signal for the duration of the bar. Between bars, however, since the offset carrier oscillator is running continuously, the phase displacement between the offset signal and the subcarrier signal will be changing continuously. Therefore, the first cycle of each successive burst will lag behind its corresponding subcarrier cycle by 30 degrees more than the first cycle of the preceding burst, and each of the seven remaining cycles in the burst will arrive in the same relative phase as the first cycle.

This wave is applied as explained in connection with Figure 1 to a combining circuit 17 where it is added to horizontal sync pulses originating in horizontal sync shaper 16. As a result of this treatment close scrutiny of the bars generated by a kinescope will not, reveal a change in color from one side of a bar to the other.

Figure 5:
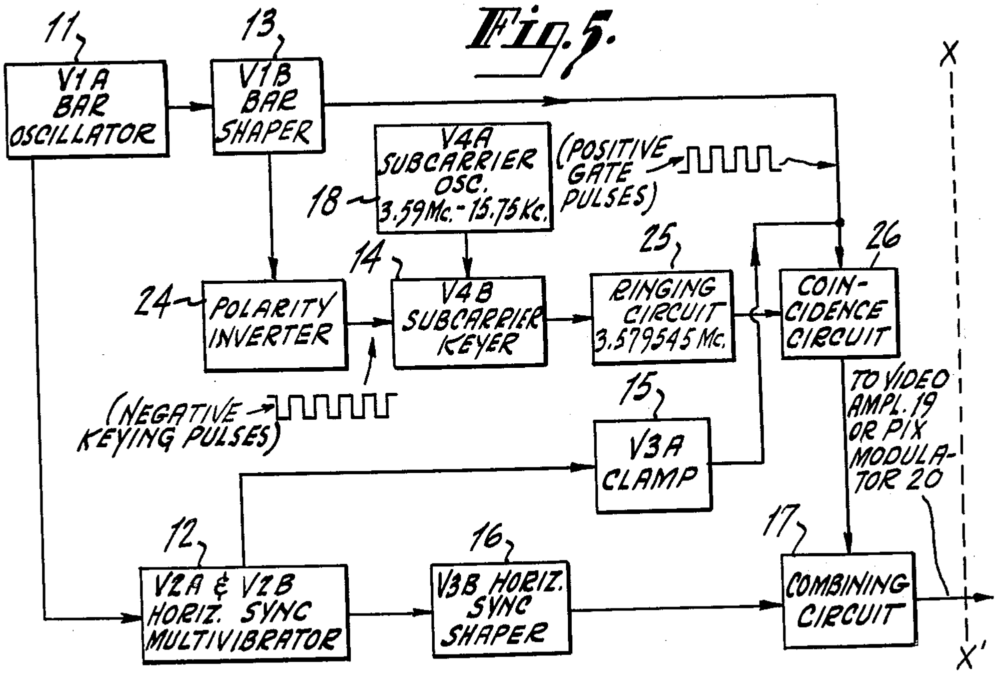
Figure 5 is a block diagram of still another form of the invention.

Another arrangement for counteracting the phase shift of the cycles within the width of one bar is shown in Figure 5. Parts similar to those in Figure 1 are similarly numbered and a recital of their operation will not be repeated. This embodiment derives a burst output at standard subcarrier frequency of 3.579545 mc. However, the phase of each successive burst is advanced 30°. A portion of the bar shaper 13 output consisting of positive pulses is applied to a polarity inverter 24 so that a set of negative pulses is obtained. The negative pulses are applied to the subcarrier keyer 14. The offset subcarrier keyer 14 is now keyed on during the "gray" time (see Figure 3) so that a short pulse of 3.563 mc. is fed to ringing circuit 25. This ringing circuit may be of the high Q type described in the U.S. patent issued to J. Avins and M. Kranenberg, No. 2,712,568 and entitled, "Color Synchronization." The ringing circuit may use a crystal which is resonant at 3.579, the standard subcarrier frequency. The ringing circuit sets up a train of oscillations at 3.579 which are not in phase with the output of the keyer 14. The phase of the ringing circuit is established to a different angle after each pulse of the offset subcarrier is applied. For each pulse the phase of the ringing circuit changes by 30 electrical degrees.

Since the output of the ringing circuit may last for hundreds of microseconds, it is coupled to one input of a coincidence circuit 26. To the other input a positive pulse from bar shaper 13 is applied during the time that a bar is to appear. The output of the coincidence circuit 26 is then applied to combining circuit 17 in which sync pulses from shaper 16 are added. As in Figure 1 the clamp 15 removes every twelfth positive pulse from the input to the coincidence circuit 26 to permit the introduction of the sync in combining circuit 17.

Having thus described the invention, what is claimed is:

1. Color television test apparatus comprising a first oscillator for producing pulses having a first repetition rate, a second oscillator coupled to said first oscillator for producing pulses having a second repetition rate equal to a submultiple of said first repetition rate, a coincidence circuit, a third oscillator for generating an oscillatory wave having a given frequency, means for coupling said third oscillator to said coincidence circuit, means for applying said pulses from said first oscillator and having said first repetition rate to said coincidence circuit, means responsive to pulses from said second oscillator for preventing said pulses having said first repetition rate from being applied to said coincidence circuit, said coincidence circuit being adapted to produce an output wave, and a combining circuit coupled to said coincidence circuit to receive said output wave and coupled to said second oscillator to insert pulses from said second oscillator into said output wave when said pulses from said first oscillator are prevented from being applied to said coincidence circuit.

2. The invention according to claim 1 with the addition of an amplifier coupled to said combining circuit for producing a signal for application to a color television transmitter for generating a color test pattern.

3. The invention according to claim 1 wherein said means for preventing said pulses having said first repetition rate from being applied to said coincidence circuit includes clamping means.

4. The invention according to claim 1 wherein said first repetition rate is 189 kc. and said second repetition rate is 15.75 kc., wherein said given frequency of said third oscillator is the standard color subcarrier frequency minus 15.75 kc., and wherein said combining circuit produces a wave having 11 bursts of said given frequency of said third oscillator and having sync pulses.

5. The invention according to claim 4 with the addition of means coupled to said combining circuit for modulating a picture carrier wave, and means coupled to said picture carrier modulating means for combining said modulated picture carrier with a sound carrier wave.

6. Apparatus for testing color television receivers, comprising a first oscillator for producing pulses having a first repetition rate, a second oscillator for producing pulses having a second repetition rate, equal to a submultiple of said first repetition rate a coincidence circuit, a third oscillator for generating an oscillatory wave having a given frequency, means for coupling said third oscillator to said coincidence circuit, means for applying said pulses having said first repetition rate to said coincidence circuit, means coupled to said second oscillator and to said coincidence circuit and responsive to pulses from said second oscillator to prevent pulses having said first repetition rate from being applied to said coincidence circuit, the output of said coincidence circuit consisting of a plurality of bursts of said given frequency, diagonal clipping means coupled to said coincidence circuit for selecting an amplitude portion of each of said bursts, said selected amplitude portion having a tapered envelope effectively causing the phase of successive cycles after the first cycle of each of said bursts to be advanced in time, amplifying means coupled to said diagonal clipping means for making the amplitude of said cycles within said tapered envelope uniform, and a combining circuit connected to said amplifying means to receive said bursts having said uniform amplitude, said combining circuit also being connected to said second oscillator to receive pulses having said second repetition rate when said preventing means prevents pulses having said first repetition rate from being applied to said coincidence circuit, said combining circuit thereupon producing a wave containing said uniform amplitude bursts and said pulses having said second repetition rate.

7. Apparatus for testing color television receivers having circuitry operating at a given horizontal deflection frequency, comprising a first oscillator for producing pulses having a first repetition rate of zero reference phase, a second oscillator for producing pulses having a second repetition rate, said second repetition rate being a sub-multiple of said first repetition rate, a first coincidence circuit, a third oscillator for generating an oscillatory wave having a given frequency, means for applying said oscillatory wave having said given frequency to said first coincidence circuit, means for applying said pulses having said first repetition rate and zero reference phase to said first coincidence circuit, a ringing circuit resonant to said given frequency plus said given horizontal deflection frequency coupled to said first coincidence circuit, said zero phase pulses having said first repetition rate causing said first coincidence circuit to produce bursts of said given frequency, said bursts of said given frequency being applied to cause said ringing circuit to ring, a second coincidence circuit coupled to said ringing circuit to receive said ringing oscillations from said ringing circuit, means coupled to said first oscillator for applying pulses having said first repetition rate in polarity opposite to said zero reference phase pulses to said second coincidence circuit, said opposite polarity pulses causing said second coincidence circuit to produce a plurality of bursts, means coupled to said second oscillator and responsive to said pulses having said second repetition rate for preventing said pulses having said opposite polarity from being applied to said second coincidence circuit, a combining circuit coupled to said second coincidence circuit and to said second oscillator, means for applying said pulses having said second repetition rate to said combining circuit during the time when said pulses having said first repetition rate are prevented from being applied to said second coincidence circuit, said combining circuit thereupon producing a wave containing said plurality of bursts of said ringing oscillations and said pulses having said second repetition rate.

8. Apparatus for testing color television receivers having circuitry operating at a given horizontal deflection frequency and color translating circuitry operating at a predetermined subcarrier frequency, comprising a circuit oscillating at a multiple of said horizontal deflection frequency, a synchronizing pulse generating circuit coupled to said oscillator to be triggered to produce a train of pulses of repetition rate corresponding to said horizontal deflection frequency, a subcarrier oscillator arranged to produce a substantially sine wave of frequency equal to the difference between said predetermined subcarrier frequency and a multiple including unity of said horizontal deflection frequency, a keying circuit coupled to said oscillating circuit and subcarrier oscillator to produce bursts of subcarrier oscillations, means coupled between said synchronizing pulse generating circuit and said keying circuit to suppress the burst occurring at the time of generation of a synchronizing pulse, a combining circuit coupled to said keying circuit and to said synchronizing pulse generating circuit to repeat said burst and said synchronizing pulses.

9. Apparatus for testing color television receivers having circuitry operating at a given horizontal deflection frequency and color translating circuitry operating at a predetermined subcarrier frequency, comprising a circuit oscillating at a multiple of said horizontal deflection frequency, synchronizing pulse generating and shaping circuitry coupled to said oscillator to be triggered thereby to produce a train of synchronizing pulses of repetition rate corresponding to said horizontal deflection frequency, a subcarrier oscillator arranged to produce a substantially sine wave of frequency equal to the difference between said predetermined subcarrier frequency and said horizontal deflection frequency, a shaping circuit coupled to said oscillating circuit, a keying circuit coupled to said shaping circuit and said subcarrier oscillator to produce bursts of subcarrier oscillations, a clamping circuit coupled between said synchronizing pulse generating circuit and said keying circuit to suppress the burst occurring at the time of generation of a synchronizing pulse, a combining circuit coupled to said keying circuit and to said synchronizing pulse generating circuit to repeat said burst and said synchronizing pulses.

10. Apparatus as defined in claim 9 and incorporating color purity circuitry comprising a diagonal clipping circuit and a variable gain amplifying circuit interposed in series between said keying and said combining circuits.

11. Apparatus as defined in claim 9 and incorporating color purity circuitry comprising a ringing circuit resonant to said subcarrier frequency and a coincidence circuit are interposed in series between said keying and said combining circuits, said clamping circuit is coupled between said synchronizing pulse generator and said coincidence circuit, and means to apply pulses from said shaping circuit of polarity opposite to those applied to said keying circuit to said coincidence circuit.

12. Apparatus as defined in claim 11 and wherein the pulses of opposite polarity from said shaping circuit are effected by a polarity inverting circuit interposed between said shaping and said keying circuits.

13. Apparatus for testing color television receivers having deflection circuitry operating at a given horizontal line frequency and color translating circuitry operating at a predetermined color subcarrier frequency, comprising in combination, a first crystal controlled oscillator for generating pulses having a repetition rate of 189 kc., first means coupled to said first oscillator for shaping pulses from said first oscillator, a multivibrator for generating pulses having a repetition rate which is the same as the horizontal line frequency, a keyer having an input circuit and an output circuit from which an output wave is derived, a second oscillator for generating an oscillatory wave having a frequency of the standard color subcarrier minus the horizontal line frequency, means for applying said last-named oscillatory wave to the input of said keyer, means for applying the shaped 189 kc. pulses from said first shaping means to the input of said keyer, switching means operative as an electrical clamping circuit having selectively a conductive or non-conductive state of operation, said switching means having a relatively low shunt impedance while conductive and a relatively high shunt impedance while non-conductive, said switching means being responsive to said horizontal line frequency pulses to cause a change from said non-conductive to said conductive state, means operatively coupling said switching means to said multivibrator for applying said horizontal line frequency pulses to said switching means, said switching means being connected across said keyer input circuit thereby to effectively prevent every 12th of said shaped 189 kc. pulses from being applied to said keyer input circuit, said keyer output wave consisting of eleven discrete pulses of the oscillatory wave from said second oscillator, a combining circuit coupled to said keyer, means coupled to said multivibrator and to said combining circuit for applying shaped multivibrator pulses to said combining circuit, said combining circuit thereupon producing a wave containing said eleven discrete pulses and one shaped multivibrator pulse at said line frequency, and a utilization circuit coupled to said combining circuit.

14. Test equipment for use in conjunction with apparatus in a color television system of the type wherein there is employed a horizontal scanning deflection wave having a predetermined frequency and a modulated subcarrier wave also have a predetermined frequency for the conveyance of image color information, said test equipment comprising in combination: means for developing a test signal wave having a constant frequency differing from said subcarrier wave frequency by an integral multiple of said predetermined horizontal deflection wave frequency; means for interrupting said test signal wave at a frequency higher than the predetermined frequency of said scanning deflection; and means for applying said test signal wave to such apparatus.

15. The method of testing a color television receiver having color display means, color demodulator means responsive to a phase modulated subcarrier wave to produce color signals for said display means, said color demodulator means having input means for said phase modulated subcarrier wave, said receiver having scanning means operative at a predetermined horizontal line frequency; comprising generating a signal of constant frequency $Y \pm nx$, where Y is the mean frequency of said subcarrier wave, $n$ is an integer, and $x$ is said horizontal line frequency, and applying said constant frequency signal to said demodulator input means to display a color spectrum.

References Cited in the file of this patent

UNITED STATES PATENTS

| | | |
|---|---|---|
| 2,683,187 | Rynn et al. | July 6, 1954 |
| 2,693,530 | Macdonald | Nov. 2, 1954 |
| 2,734,939 | Houghton | Feb. 14, 1956 |

FOREIGN PATENTS

| | | |
|---|---|---|
| 520,349 | Great Britain | Apr. 22, 1940 |
| 233,313 | Switzerland | July 15, 1944 |